(12) United States Patent
Jung et al.

(10) Patent No.: US 8,019,534 B2
(45) Date of Patent: Sep. 13, 2011

(54) METHOD AND APPARATUS FOR MAP-UPDATING OF NAVIGATION SYSTEM

(75) Inventors: Ji-woon Jung, Seoul (KR); Hyo-sun Shim, Seongnam-si (KR); Hyun-chang Shin, Gunpo-si (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 555 days.

(21) Appl. No.: 12/212,126

(22) Filed: Sep. 17, 2008

(65) Prior Publication Data
US 2009/0281716 A1 Nov. 12, 2009

(30) Foreign Application Priority Data
May 9, 2008 (KR) .................. 10-2008-0043362

(51) Int. Cl.
*G01C 21/00* (2006.01)
*G06F 19/00* (2006.01)

(52) U.S. Cl. ......... 701/206; 701/210; 707/102; 717/169

(58) Field of Classification Search .................. 701/206, 701/200, 210, 211, 208; 707/3, 1, 102; 709/217, 709/218; 455/456.1; 717/173, 169
See application file for complete search history.

(56) References Cited

U.S. PATENT DOCUMENTS

| 7,751,968 B2 * | 7/2010 | Yamada et al. ................ 701/200 |
| 2005/0102099 A1 * | 5/2005 | Linn ............................. 701/209 |
| 2006/0190507 A1 * | 8/2006 | Sekine et al. ................. 707/205 |
| 2007/0126605 A1 * | 6/2007 | Aleksic et al. ........... 340/995.14 |

* cited by examiner

*Primary Examiner* — Tan Q Nguyen
(74) *Attorney, Agent, or Firm* — Staas & Halsey LLP

(57) ABSTRACT

A method and apparatus for map-updating of a navigation system by automatically generating point of interest (POI) data that is not registered and automatically generating a POP alias of POI data that is already registered, the method including: logging at least one piece of point of interest (POI) data if the POI data input in order to find a destination is not found in the navigation terminal; and registering the logged at least one piece of POI data as a candidate POI alias of newly input POI data if a destination designated by the navigation terminal according to the newly input POI data is equal to an arrived destination.

40 Claims, 10 Drawing Sheets

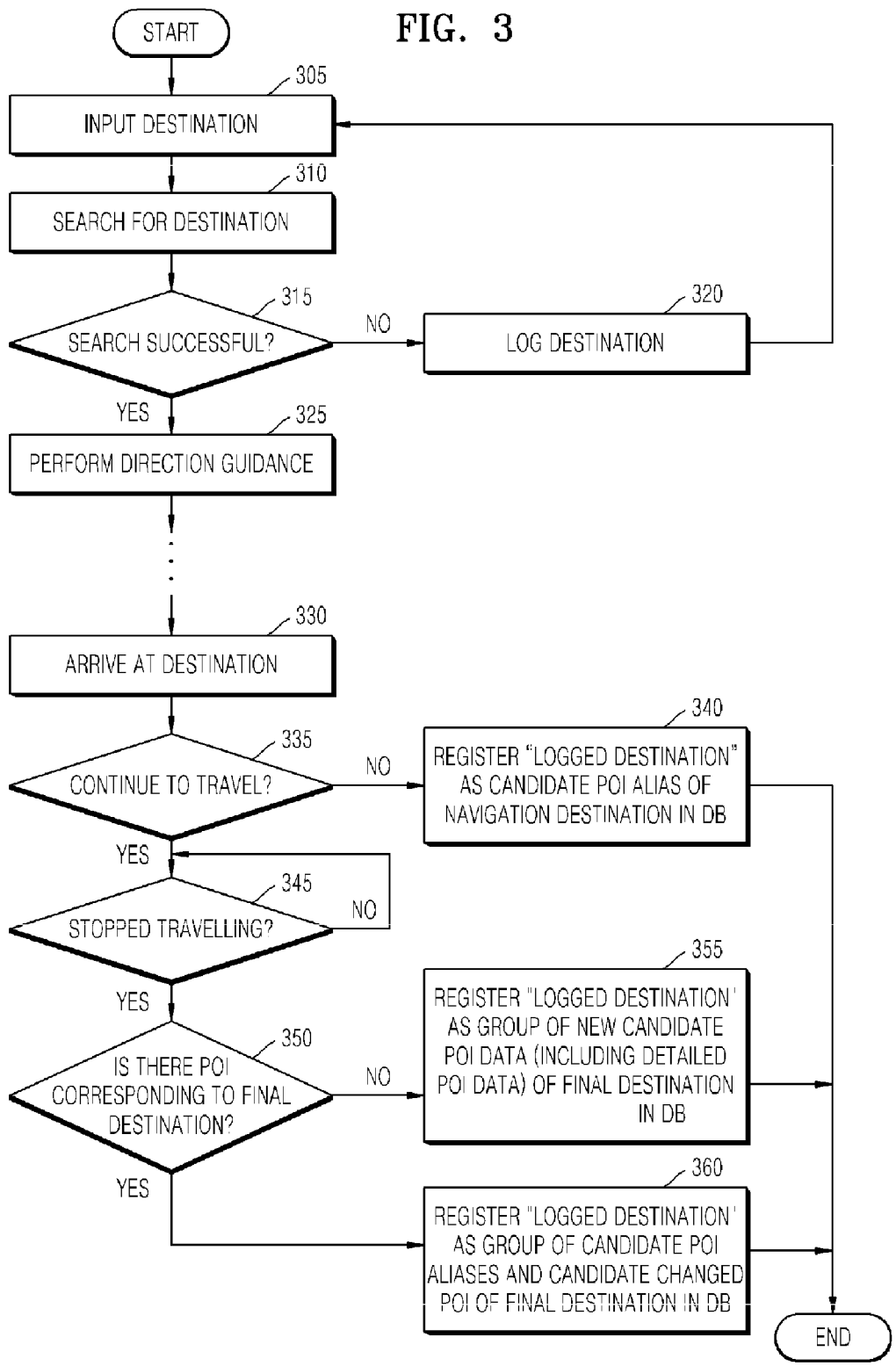

METHOD AND APPARATUS FOR MAP-UPDATING OF NAVIGATION SYSTEM

CROSS-REFERENCE TO RELATED APPLICATION

This application claims the benefit of Korean Patent Application No. 2008-43362, filed on May 9, 2008 in the Korean Intellectual Property Office, the disclosure of which is incorporated herein by reference.

BACKGROUND OF THE INVENTION

1. Field of the Invention

Aspects of the present invention relate to a navigation system, and more particularly, to a method and apparatus for map-updating in a navigation system that automatically generates point of interest (POI) data that is not registered and that automatically generates a POI alias of POI data that is already registered.

2. Description of the Related Art

Generally, a navigation apparatus includes a global positioning system (GPS) receiving unit and map data stored on a compact disc read only memory (CD-ROM) or a digital versatile disc (DVD-ROM). Specifically, the global positioning system receiving unit receives a current location of a mobile vehicle from a plurality of satellites, and indicates the current location of the mobile vehicle on a map, generated from the map data, while displaying the map with a travel route of the mobile vehicle on a screen. Thus, by virtue of the navigation apparatus, a driver can clearly know the current travel situation of the mobile vehicle and can be easily guided in a trip to a particular destination.

Such a navigation apparatus stores map information and point of interest (POI) data in order to provide travel information to a driver. In this case, the POI data is information regarding, for example, a location of public institutions, schools, department stores, sanctuaries, parks, fast food outlets, markets, restaurants, etc., and may also provide additional information of these places (such as telephone numbers and addresses).

In a conventional navigation apparatus, POI data is restrictive in terms of a number of pieces of POI data. Additionally, the POI data may not be satisfactorily updated to new POI data. For example, when a particular desired destination does not have a corresponding POI data entry, a user has to search a database to find an entry for a landmark or building that the user knows is close to the desired destination, and then personally finds the desired destination after being guided to the nearby landmark and/or building.

In addition, POI data provided by a navigation apparatus uses standard names for places. That is, in order to input a destination, a user has to know the standard name of the destination. Such a navigation apparatus has several problems arising with POI data. For example, when a destination and corresponding POI data has various aliases, since a manufacturer of the navigation apparatus cannot know all aliases of the POI data, a standard name of the POI data is generally used. In this case, not all users use the same alias of the POI data, and thus it is difficult to search for the POI data in a database. Thus, in order to use the navigation apparatus, a user additionally must know the standard name of the POI data. For example, "Yung-tong Ju-gong Apartment Complex 4" has aliases "Chung-myeong Ju-gong Apartment," "Chung-myeong Village," etc. When the standard name, "Yung-tong Ju-gong Apartment Complex 4" is used in order to search, the destination can be found. However, when the aliases "Chung-myeong Ju-gong Apartment," "Chung-myeong Village," etc., the destination is not found in the database.

Furthermore, there are many areas to which public access is either not allowed or not easy to get. In this regard, it is difficult to register detailed POI data corresponding to such areas in a database. Thus, a user has to move to a location close to a destination according to rough POI data including detailed POI data, and then personally finds the destination from this location without help of a navigation apparatus. Generally, a database of the navigation apparatus does not provide detailed POI data of apartment complexes and school and public institutions, and provides only rough POI data regarding the main entrance of a corresponding place. For example, when a new apartment complex is built, in many cases nobody can enter the apartment complex except for inhabitants or visitors thereof. In addition, in many cases nobody can enter a company complex except for workers thereof. In these cases, it is difficult to register detailed POI data in the database. Thus, when a user wants to find a particular building of a particular company complex or a student welfare organization of a particular university, the user cannot be helped by a navigation apparatus.

Moreover, when POI data of a particular destination is omitted or is not updated, the POI data may not be found in a navigation apparatus. In this case, a user may have to input a big building close to a destination as a rough destination in order to be guided to the rough destination, and then has to find the desired destination without help of the navigation apparatus. For example, when "Chong-ro Restaurant" cannot be found in a database, the user searches for "Chong-ro Subway Station" so as to arrive at Chong-ro and then find "Chong-ro Restaurant".

Thus, since POI data contained in a navigation apparatus is restrictive in terms of the number of pieces of POI data and the degree of detail, a user may have difficulty in using a navigation service to find an actually desired destination. Even if POI data corresponding to the destination is registered in the navigation apparatus, the user may also have difficulty in inputting the destination since the user does not know an accurate standard name of the POI data.

SUMMARY OF THE INVENTION

Aspects of the present invention provide a method and apparatus for map-updating in a navigation system that automatically generates point of interest (POI) data that is not registered and that automatically generates a POI alias of POI data that is already registered by a comparison between a final destination designated by a navigation terminal and a destination input by a user. Aspects of the present invention also provide a navigation terminal using the method of map-updating.

According to an aspect of the present invention, there is provided a method of map-updating of a navigation terminal, the method including: logging point of interest (POI) data if POI data for a destination is not found in the navigation terminal; and registering the logged POI data that is not found as a candidate POI alias of newly input POI data when a destination designated by the navigation terminal according to the newly input POI data is equal to an arrived destination.

According to another aspect of the present invention, there is provided a method of map-updating of a navigation terminal, the method including: logging POI data input in order to find a navigation destination when the POI data is not found in the navigation terminal; and registering the logged POI data as new candidate POI data of an arrived destination if a destination designated by the navigation terminal is not equal to the arrived destination and if predetermined POI data is not found for an area of predetermined range from the arrived destination.

According to yet another aspect of the present invention, there is provided a method of map-updating of a navigation terminal, the method including: logging POI data input in order to find a navigation destination when the POI data is not found in the navigation terminal; and registering the logged POI data as a candidate POI alias and candidate changed POI data of predetermined POI data if a destination designated by the navigation system is not equal to the arrived destination and if the predetermined POI data is not found for an area of predetermined range from the arrived destination.

According to still another aspect of the present invention, there is provided a method of map-updating of a server, the method including: collecting a group of candidate POI aliases, a group of new POI data, and/or a group of candidate changed POI data of predetermined POI data in a time sequence; determining a POI alias, new POI data, and/or a changed POI alias of the predetermined POI data from among the group of candidate POI aliases, the group of new POI data, and/or the group of candidate changed POI data of predetermined POI data according to a predetermined analysis; and transmitting the determined POI alias, the new POI data, and/or the changed POI alias of the predetermined POI data as updated POI data to a navigation terminal.

According to another aspect of the present invention, there is provided a navigation terminal to provide a travel route, the navigation terminal including: a point of interest (POI) database unit to store POI data; a display unit to display the travel route; and a control unit to log POI data corresponding to a destination when the POI data is not found in the POI database unit, and to register the logged POI data as a candidate POI alias or new candidate POI data of newly input POI data, or a candidate changed POI data of predetermined POI data according to a comparison between a destination designated by the navigation terminal according to the newly input POI data and an arrived destination in the POI database unit.

According to another aspect of the present invention, there is provided a method of map-updating of a navigation terminal, the method including: logging point of interest (POI) data if POI data for a destination is not found by the navigation terminal; and registering, in the navigation terminal, the logged POI data as a candidate POI alias of existing POI data for the destination and/or as new candidate POI data.

According to yet another aspect of the present invention, there is provided a method of map-updating of a navigation terminal, the method including: logging point of interest (POI) data input in order to find a navigation destination when the POI data is not found in the navigation terminal; and registering the logged POI data as new candidate POI data of an arrived destination if a destination designated by the navigation terminal is not equal to the arrived destination.

According to still another aspect of the present invention, there is provided a method of map-updating of a navigation terminal, the method including: logging point of interest (POI) data if POI data for a destination is not found by the navigation terminal; registering the logged POI data as a candidate POI alias of newly input POI data if a destination designated by the navigation terminal according to the newly input POI data is equal to an arrived destination; registering the logged POI data as new candidate POI data of an arrived destination if a destination designated by the navigation terminal is not equal to the arrived destination and if predetermined POI data is not found for an area of predetermined range from the arrived destination; and registering the logged POI data as the candidate POI alias and/or candidate changed POI data of predetermined POI data if the destination designated by the navigation terminal is not equal to the arrived destination and if the predetermined POI data is found for the area of predetermined range from the arrived destination.

According to another aspect of the present invention, there is provided a navigation system including: a navigation terminal to provide a travel route, the navigation terminal including: a point of interest (POI) database unit to store POI data, a display unit to display a travel route, a control unit to log POI data corresponding to a destination when the POI data is not found in the POI database unit, and to register the logged POI data as a candidate POI alias or new candidate POI data of newly input POI data, or a candidate changed POI data of predetermined POI data according to a comparison between a destination designated by the navigation terminal according to the newly input POI data and an arrived destination in the POI database unit, and a transmission unit to transmit the candidate POI alias, the new candidate POI data, or the candidate changed POI data; and a server including: a receiving unit to receive the candidate POI alias, the new candidate POI data, or the candidate changed POI data, a server control unit to determine a POI alias, new POI data, and/or a changed alias of the predetermined POI data from among the candidate POI aliases, the new candidate POI data, and/or the candidate changed POI data of the predetermined POI data according to a predetermined analysis, and transmitting the determined POI alias, the new POI data, and/or the changed POI alias of the predetermined POI data as updated POI data to the navigation terminal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart illustrating a method of map-updating in a navigation terminal, according to an embodiment of the present invention;

DETAILED DESCRIPTION OF THE EMBODIMENTS

Figure 1:
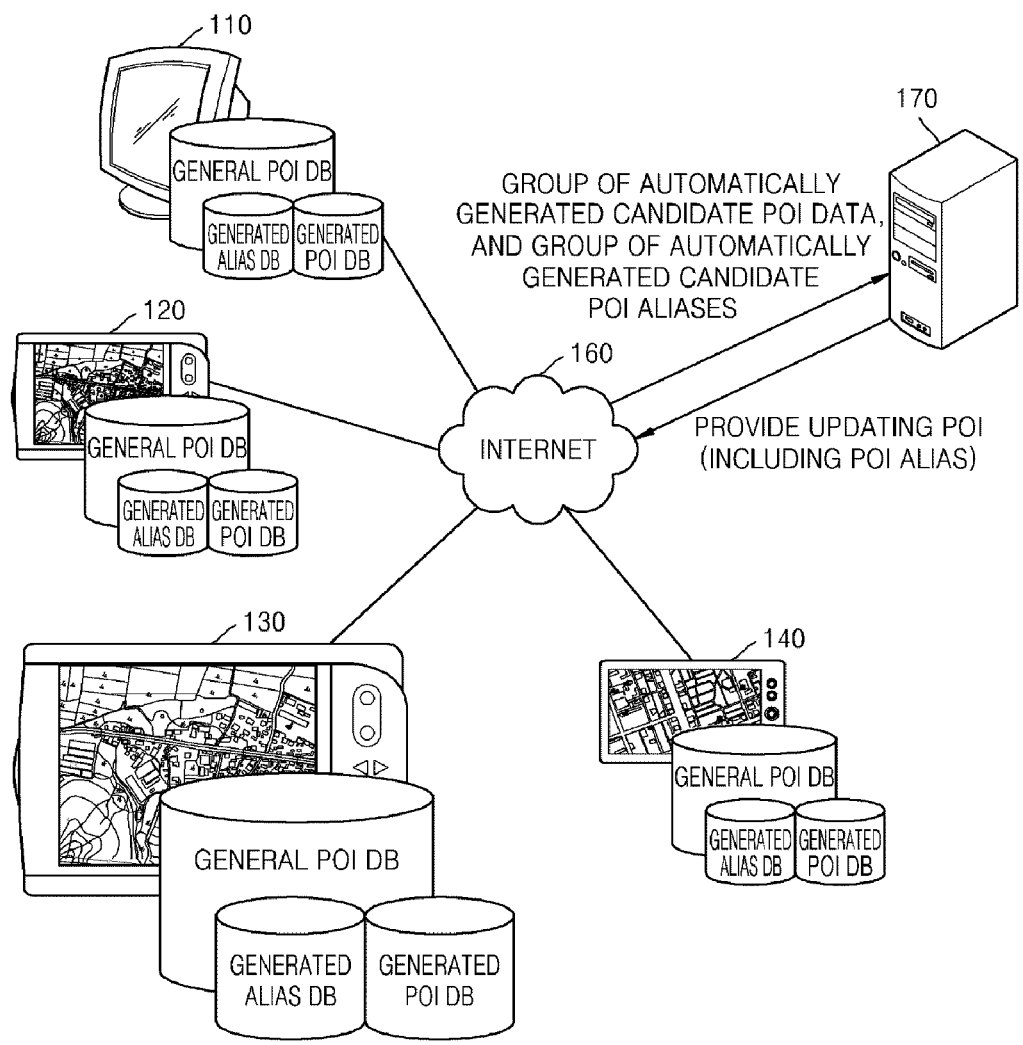
FIG. 1 illustrates a navigation system, according to an embodiment of the present invention

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a navigation system, according to an embodiment of the present invention. Referring to FIG. 1, the navigation system includes navigation terminals 110, 120, 130 and 140, and a map server 170. The navigation terminals 110, 120, 130 and 140 transmit and receive point of interest (POI) data to and from the map server 170 and/or an Internet network 160. Alternatively or additionally, the navigation terminals 110, 120, 130 and 140 may directly transmit and receive the POI data to and from the map server 170 via a peer to peer (P2P) network.

The navigation terminals 110, 120, 130 and 140 store POI data and map information that are used in real time in order to display a map, guide a travel route, etc., in a database, and automatically generate a candidate POI alias, candidate POI data, a predetermined POI alias, and candidate changed POI data. Furthermore, the navigation terminals 110, 120, 130 and 140 transmit a group of candidate POI data and a group of POI aliases, which are automatically generated, to the map server 170 directly or via the Internet network 160. The navigation terminals 110, 120, 130 and 140 receive updated map information and POI data from the map server 170. In addition, each of the navigation terminals 110, 120, 130 and 140 includes a general POI database, an alias database to store POI aliases that are automatically generated, and a POI database to store POI data that is automatically generated.

The map server 170 manages map databases and POI databases, which are used in the navigation terminals 110, 120, 130 and 140, and may also provide traffic information used for navigation to the navigation terminals 110, 120, 130 and 140. In particular, the map server 170 analyzes the group of candidate POI data and the group of POI aliases, which are uploaded from the navigation terminals 110, 120, 130 and 140, using a predetermined analyzing process so as to determine POI data and a POI alias, and then provides updated POI data corresponding to the determined POI data and POI alias to the navigation terminals 110, 120, 130 and 140.

According to an aspect of the present invention, memory cards or units of the navigation terminals 110, 120, 130 and 140 may be connected to a personal computer (PC) so as to transmit and receive POI data between the PC and the map server 170. Also, the navigation terminals 110, 120, 130 and 140 may perform the determining of the POI data and the POI alias rather than or in addition to the map server 170.

Figure 2A:
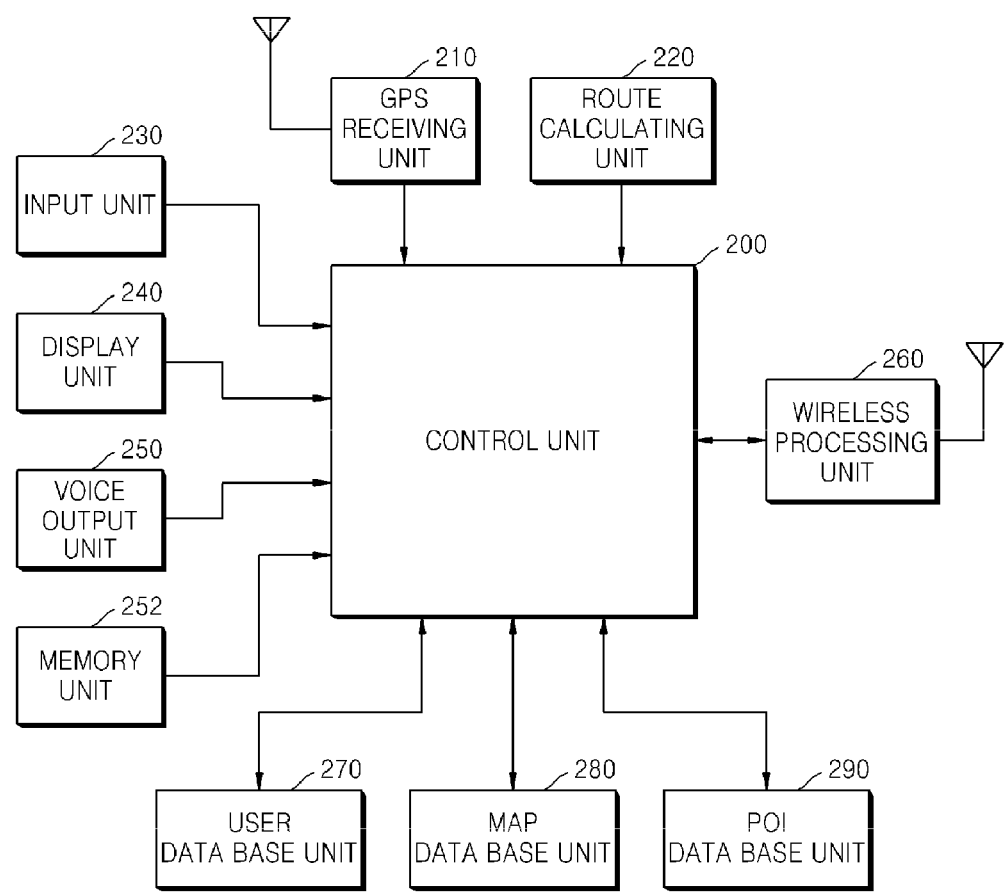
FIG. 2A is a block diagram of a navigation terminal, according to an embodiment of the present invention.

FIG. 2A is a block diagram of a navigation terminal, according to an embodiment of the present invention. Referring to FIG. 2A, the navigation terminal includes a control unit 200, a global positioning system (GPS) receiving unit 210, a route calculating unit 220, an input unit 230, a display unit 240, a voice output unit 250, a wireless processing unit 260, a memory unit 252, a user database unit 270, a map database unit 280, and a POI database unit 290.

The GPS receiving unit 210 receives microwave signals through an antenna from one or more GPS satellites. The route calculating unit 220 finds a route between a destination and a current location of a mobile vehicle, information of which is received by the GPS receiving unit 210. The input unit 230 includes input devices (such as number keys, operation keys, a dial, a touch screen) to accomplish various operations, and transmits an electric signal of key data to the control unit 200 according to a user's input.

The display unit 240 displays map data, a current location of the mobile vehicle, a travel route of the mobile vehicle, etc. on a screen under a control of the control unit 200. The voice output unit 250 outputs audio data that is related to travel-route guidance in the form of a voice. The wireless processing unit 260 is connected to an antenna, converts a wireless signal received from a map server to an intermediate frequency signal, and converts the intermediate frequency signal that is to be transmitted to the map server to a wireless signal.

The memory unit 252 stores a program for operation of the control unit 200 and data processed during the operation of the control unit 200. The user database unit 270 stores the travel route received from the map server. The map database unit 280 stores map data. The POI database unit 290 stores general POI data, POI alias data, new POI data, and changed POI data.

The control unit 200 detects the current location of the mobile vehicle based on the current location received from GPS receiving unit 210, matches the detected current location of the mobile vehicle with the map data stored in the map database unit 280, determines a travel route of the mobile vehicle, and performs a guiding operation corresponding to the determined travel route. In particular, when the control unit 200 fails to find POI data that is input through the input unit 230 in order to find the destination, the control unit 200 logs the POI data. Then, according to a comparison between a user's actual arriving point and a destination designated by the navigation terminal according to newly-input POI data, the logged POI data that has not been found is registered as a candidate POI alias of the newly-input POI data, new candidate POI data, or a candidate POI alias or candidate changed POI data of predetermined POI data in the POI database unit 290. In addition, the control unit 200 receives updated map data and POI data through the wireless processing unit 260 from the map server, and the updated map data and POI data are stored in the map database unit 280 and the POI database unit 290.

Figure 2B:
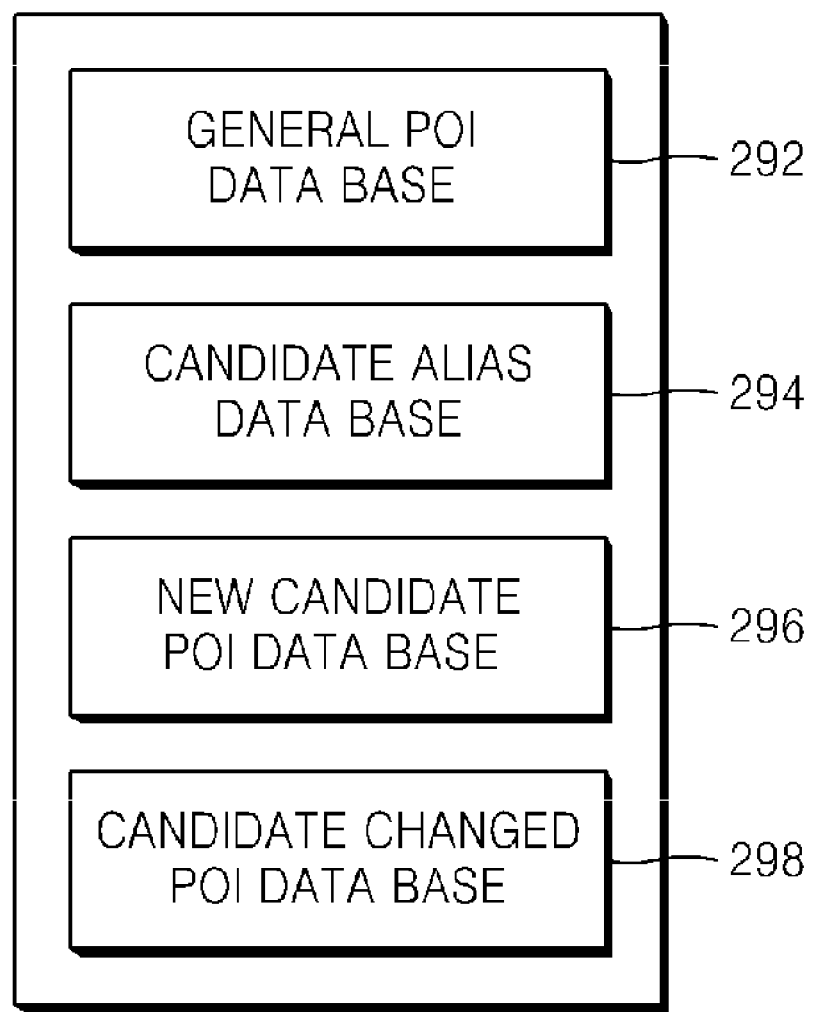
FIG. 2B illustrates a point of interest (POI) database unit illustrated in FIG. 2A in more detail.

FIG. 2B illustrates the POI database unit 290 illustrated in FIG. 2A in more detail. Referring to FIG. 2B, the POI database unit 290 includes a general POI database 292, a candidate alias database 294, a new candidate POI database 296, and a candidate changed POI database 298.

FIG. 3 is a flowchart illustrating a method of map-updating in a navigation terminal, according to an embodiment of the present invention. Referring to FIG. 3, POI data corresponding to a destination that is input by a user and a current location (i.e., a starting point) is detected in operation 305. The input POI data corresponding to the destination is searched for in a POI database in operation 310. Accordingly, it is determined whether the POI data corresponding to the destination is successfully found in the POI database in operation 315.

At this time, when the POI data corresponding to the destination cannot be found (operation 315), the POI data corresponding to the destination is logged in operation 320, and then newly-input POI data is searched for. At least one piece of POI data may be logged in the POI database.

When the newly-input POI data is successfully found (operation 315), direction-guidance is performed according to a suitable travel route in operation 325. When a mobile vehicle arrives at the destination according to the direction-guidance in operation 330, it is determined whether the mobile vehicle continues to travel in operation 335. For example, by detecting whether the mobile vehicle is turned on or off, it can be determined whether the mobile vehicle continues to travel.

At this time, when it is determined that the mobile vehicle does not continue to travel (operation 335), the logged POI data is registered as one element of a group of candidate POI aliases corresponding to the destination in the POI database in operation 340. That is, if the destination corresponding to the newly-input POI data is the same as the actual arriving point of the vehicle, the logged POI data that could not be found is registered as a candidate POI alias of the newly-input POI data.

If it is determined that the mobile vehicle continues to travel (operation 335), whether the mobile vehicle has stopped traveling is periodically checked in operation 345.

Next, when the mobile vehicle stops traveling, it is determined whether there is POI data corresponding to a final destination of the mobile vehicle in operation 350. In this regard, the final destination at which the mobile vehicle actually stops travelling may be recognized in a variety of ways. For example, a point of time when the mobile vehicle is turned off, the navigation terminal is powered off, or the navigation terminal is powered on after the mobile vehicle is again turned on is used to recognize the final destination. That is, the navigation terminal may recognize the final destination by detecting whether the navigation terminal is powered on or off, or whether the mobile vehicle is turned on or off.

Next, when there is no POI data corresponding to the final destination, the logged POI data corresponding to the destination is registered as a group of new candidate POI data or a group of candidate detailed POI data of the final destination in the POI database in operation 355. That is, when a destination designated according to the newly-input POI data by the navigation system is not the same as the user's actual arriving point, and when predetermined POI data could not be found in spite of searching a predetermined region around the user's actual arriving point, the logged POI data is registered as new candidate POI data corresponding to the user's actual arriving point.

In the meantime, when there is POI data corresponding to the final destination where the mobile vehicle actually stops traveling, the logged POI data corresponding to the destination is registered as one element of a group of candidate POI aliases and group of candidate changed POI data of the final destination in the POI database in operation 360. That is, when the destination designated according to the newly-input POI data by the navigation system is not the same as the user's actual arriving point, and when predetermined POI data is found by searching the region around the user's actual arriving point, the logged POI data is registered as a candidate POI alias and candidate changed POI data of the predetermined POI data.

The registered candidate POI alias, the new candidate POI data, and the candidate POI alias and candidate changed POI data of the predetermined POI data are transmitted to a map server. Accordingly a POI alias, new POI data, and a POI alias and changed POI data of the predetermined POI data are received from the map server.

Figure 4:
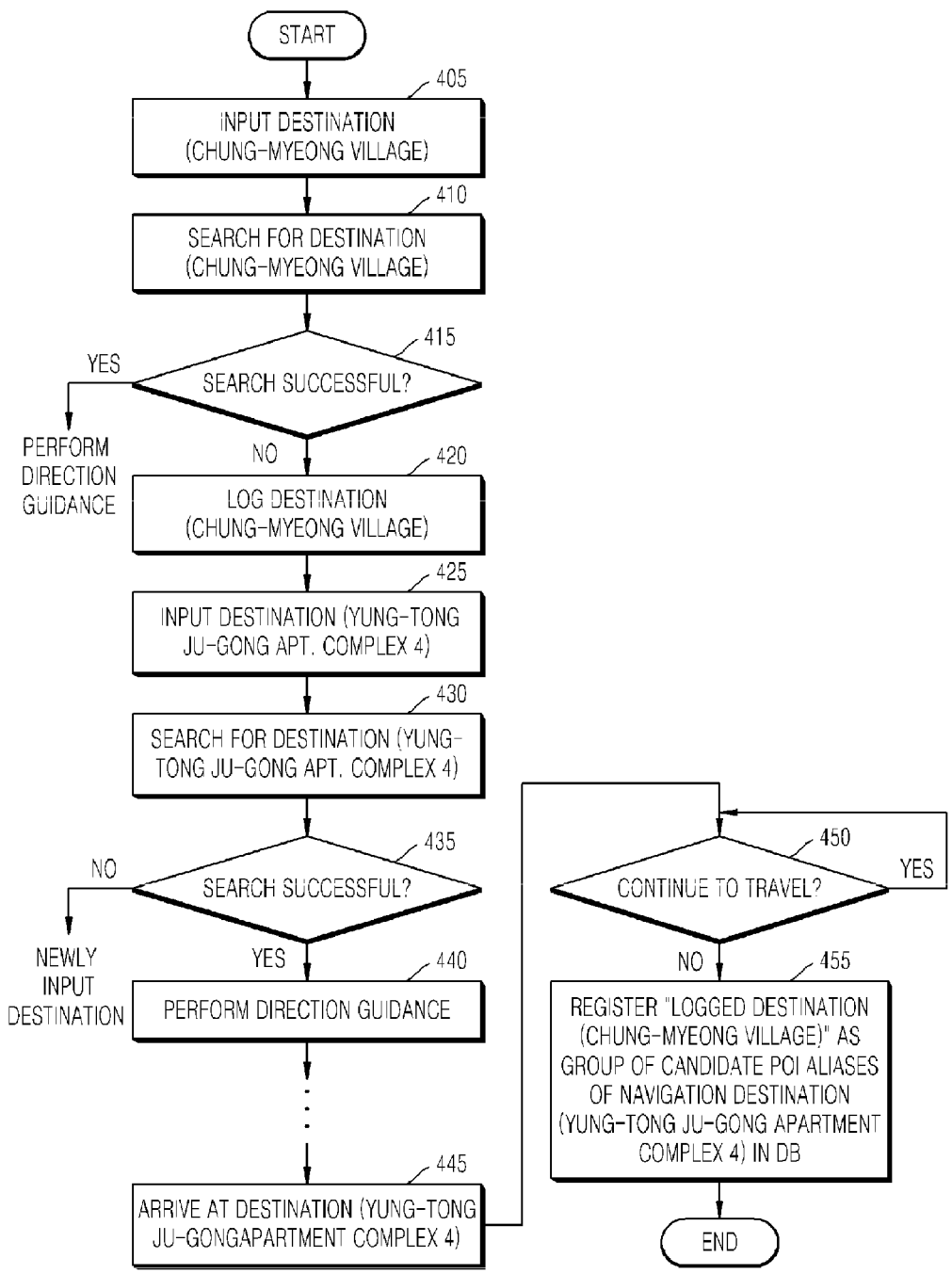
FIG. 4 is a flowchart illustrating a method of registering a candidate POI alias illustrated in FIG. 3, according to an embodiment of the present invention.

FIG. 4 is a flow chart illustrating a method of registering the candidate POI alias illustrated in FIG. 3, according to an embodiment of the present invention. Referring to FIG. 4, a user inputs first POI data corresponding to a destination as "Chung-myeong Village" in operation 405. The input "Chung-myeong Village" is searched for in a POI database in operation 410. Then, it is determined whether "Chung-myeong Village" corresponding to the destination is successfully found in the POI database in operation 415.

When "Chung-myeong Village" corresponding to the destination cannot be found, "Chung-myeong Village" is logged in operation 420. The user newly inputs second POI data corresponding to the destination as "Yung-tong Ju-gong Apartment Complex 4" in operation 425. The input "Yung-tong Ju-gong Apartment Complex 4" is searched for in the POI database in operation 430. Then, it is determined whether "Yung-tong Ju-gong Apartment Complex 4" corresponding to the destination is successfully found in the POI database in operation 435.

When the second POI data (i.e., "Yung-tong Ju-gong Apartment Complex 4") is successfully found, direction-guidance is performed according to a suitable travel route in operation 440. When a mobile vehicle arrives at "Yung-tong Ju-gong Apartment Complex 4" corresponding to the destination according to the direction-guidance in operation 445, it is determined whether the mobile vehicle continues to travel in operation 450.

If it is determined that the mobile vehicle does not continue to travel (operation 450), the logged "Chung-myeong Village" is registered as an element of a group of candidate POI aliases of "Yung-tong Ju-gong Apartment Complex 4" corresponding to a navigation destination in operation 445. That is, when a navigation terminal fails to find the first POI data corresponding to the destination, succeeds in finding the second POI data corresponding to the destination, and the mobile vehicle arrives at the destination according to the second POI data, the second POI data can be inferred as a standard name of POI data corresponding to the destination, and the first POI data can be inferred as a POI alias of the second POI data.

Figure 5:
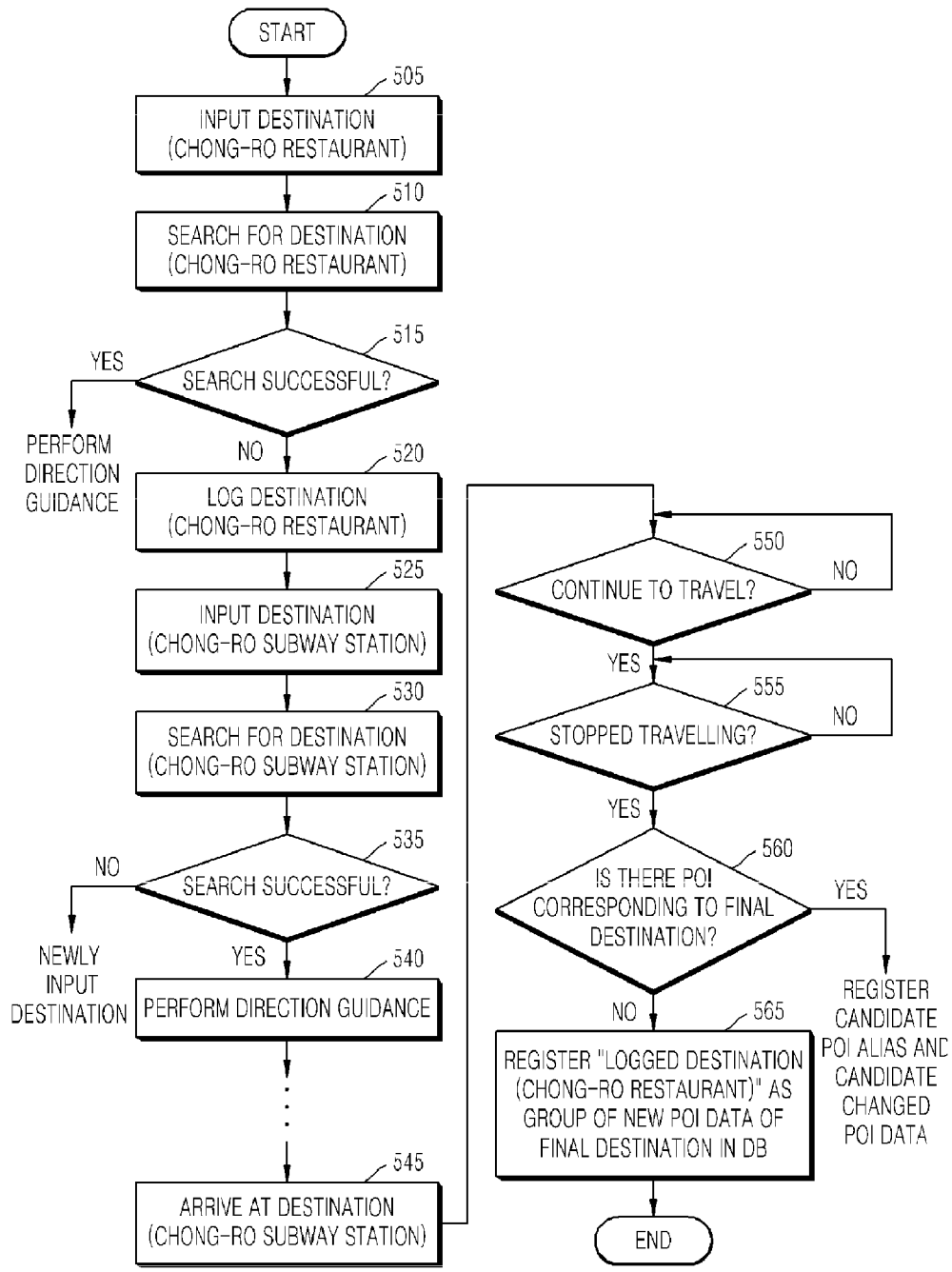
FIG. 5 is a flowchart of registering a new candidate POI data of FIG. 3, according to an embodiment of the present invention.

FIG. 5 is a flow chart of registering the new candidate POI data of FIG. 3, according to an embodiment of the present invention. Referring to FIG. 5, a user inputs first POI data corresponding to a destination "Chong-ro Restaurant" in operation 505. The input "Chong-ro Restaurant" is searched for in a POI database in operation 510.

It is determined whether "Chong-ro Restaurant" corresponding to the destination is successfully found in the POI database in operation 515. At this time, when "Chong-ro Restaurant" corresponding to the destination cannot be found, "Chong-ro Restaurant" is logged in operation 520.

The user newly inputs second POI data corresponding to the destination as "Chong-ro Subway Station" in operation 525. The input "Chong-ro Subway Station" is searched for in the POI database in operation 530. Then, it is determined whether "Chong-ro Subway Station" corresponding to the destination is successfully found in the POI database in operation 535.

When the second POI data, i.e., "Chong-ro Subway Station" corresponding to the destination is successfully found (operation 535), direction-guidance is performed according to a suitable travel route in operation 540. When a mobile vehicle arrives at "Chong-ro Subway Station" corresponding to the destination according to the direction-guidance in operation 545, it is determined whether the mobile vehicle continues to travel in operation 550.

If it is determined that the mobile vehicle continues to travel (operation 550), a point of time is checked when the mobile vehicle actually stops traveling in operation 555. If the mobile vehicle stops travelling (operation 550), it is checked whether there is POI data corresponding to a final destination where the mobile vehicle actually stops traveling in operation 560.

Next, when there is no POI data corresponding to the final destination, the logged "Chong-ro Restaurant" corresponding to the destination is registered as one element of a group of new candidate POI data or a group of candidate detailed POI data of the final destination in the POI database in operation 565.

That is, when a navigation terminal fails to find the first POI data corresponding to a destination and succeeds in finding the second POI data corresponding to the destination, the mobile vehicle does not arrive at the destination according to the second POI data, and there is no POI data corresponding to a final destination where the mobile vehicle actually arrives, the first POI data can be referred to as detailed POI data of the second POI data or new POI data of the final destination where the mobile vehicle actually arrives.

Figure 6:
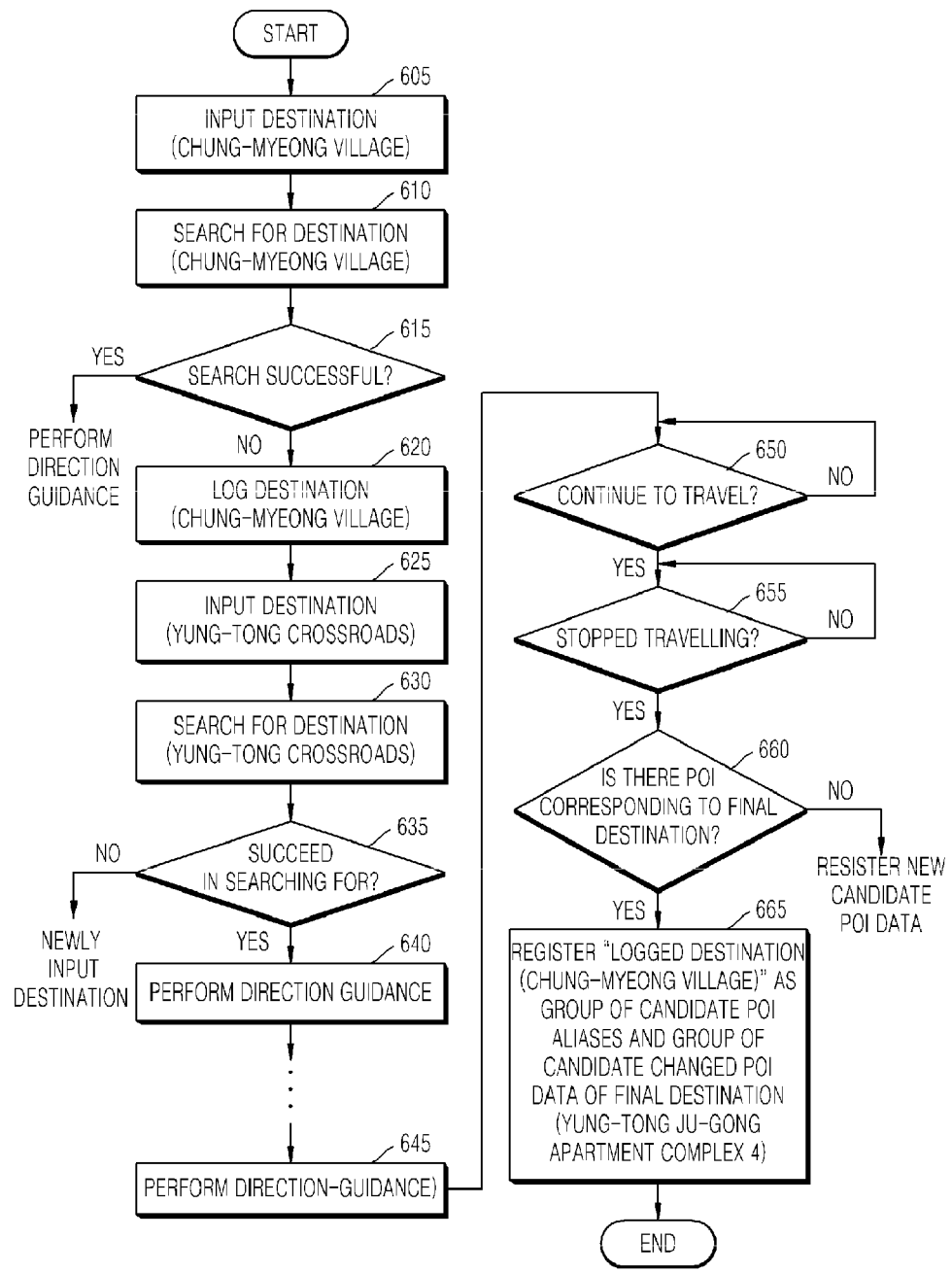
FIG. 6 is a flowchart of a method of registering a candidate POI alias and changed POI data of predetermined POI data, according to an embodiment of the present invention.

FIG. 6 is a flow chart of a method of registering a candidate POI alias and changed POI data of predetermined POI data, according to an embodiment of the present invention. Referring to FIG. 6, a user inputs first POI data corresponding to a destination as "Chung-myeong Village" in operation 605. The input "Chung-myeong Village" is searched for in a POI database in operation 610.

It is determined whether "Chung-myeong Village" corresponding to the destination is successfully found in the POI database in operation 615. At this time, if "Chung-myeong Village" cannot be found (operation 615), "Chung-myeong Village" is logged in operation 620.

Then, the user newly inputs second POI data corresponding to the destination as "Yung-tong crossroads" in operation 625. The input "Yung-tong crossroads" is searched for in the POI database in operation 630. Accordingly, it is determined whether "Yung-tong crossroads" corresponding to the destination is successfully found in the POI database in operation 635. When the second POI data (i.e., "Yung-tong crossroads") is successfully found, direction-guidance is performed according to a suitable travel route in operation 640.

When a mobile vehicle arrives at "Yung-tong crossroads" corresponding to the destination according to the direction-guidance in operation 645, it is determined whether the mobile vehicle continues to travel in operation 650. If it is determined that the mobile vehicle continues to travel, a point of time is checked when the mobile vehicle actually stops traveling in operation 655. If the mobile vehicle stops travelling, it is checked whether there is POI data corresponding to a final destination where the mobile vehicle actually stops traveling in operation 660.

When there is POI data "Yung-tong Ju-gong Apartment Complex 4" corresponding to the final destination where the mobile vehicle stops travelling, the logged "Chung-myeong Village" is registered as one element of a group of candidate POI aliases and group of candidate changed POI data of "Yung-tong Ju-gong Apartment Complex 4" in the POI database in operation 665.

That is, when a navigation terminal fails to find the first POI data corresponding to a destination and succeeds in finding the second POI data corresponding to the destination, the mobile vehicle does not arrive at the destination according to the second POI data, and there is POI data corresponding to a final destination where the mobile vehicle actually arrives, the first POI data can be inferred as a POI alias of the final destination. Alternatively, the POI data corresponding to the final destination where the mobile vehicle actually arrives is removed, and the first POI data can be inferred as candidate changed POI data.

Figure 7A:
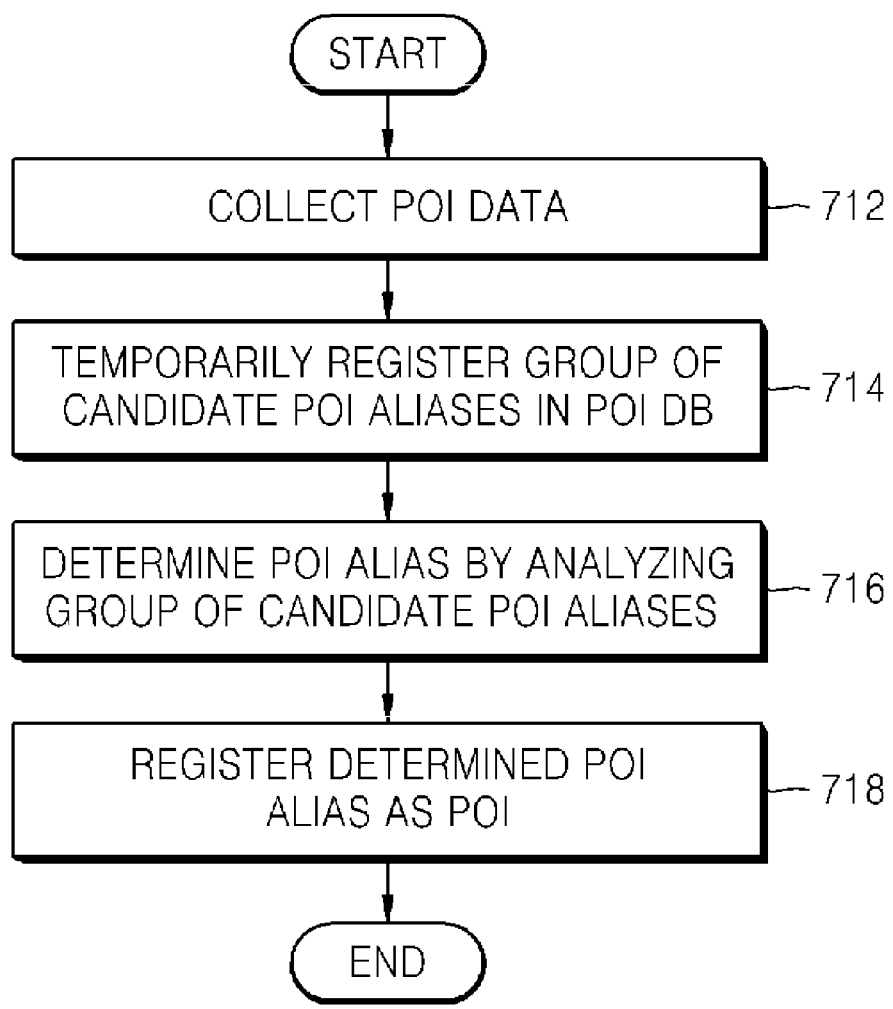
FIGS. 7A through 7C are flowcharts of methods of map-updating of a map server, according to embodiments of the present invention.
Figure 7B:
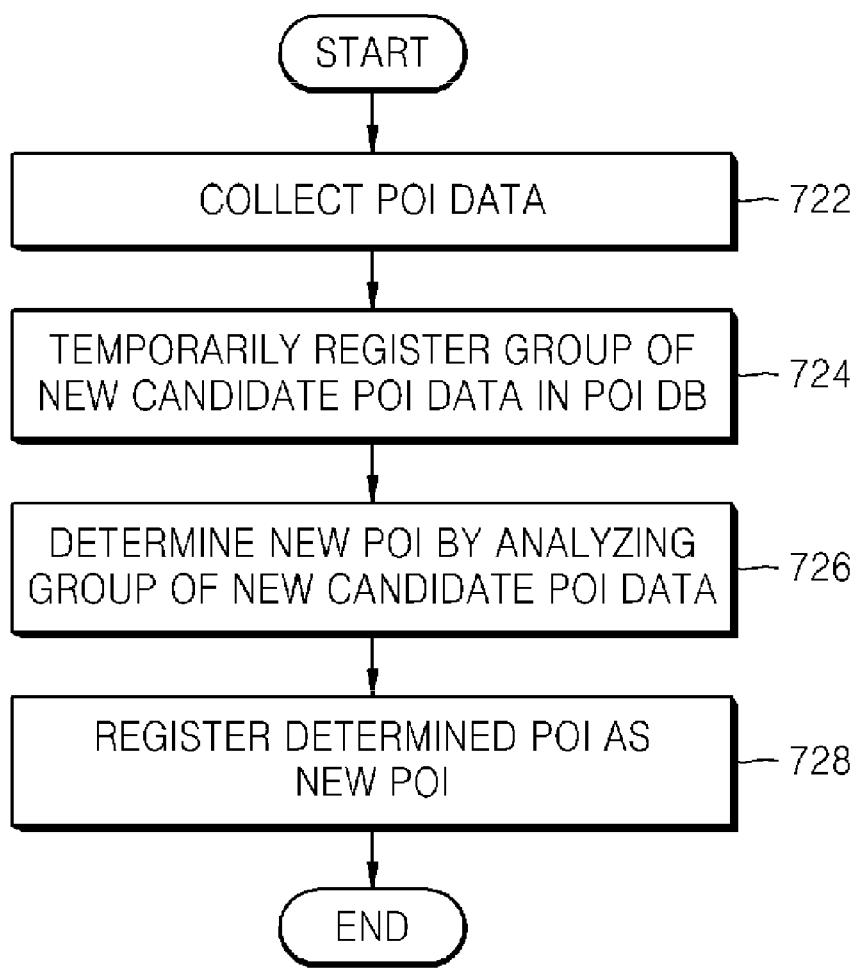
Figure 7C:
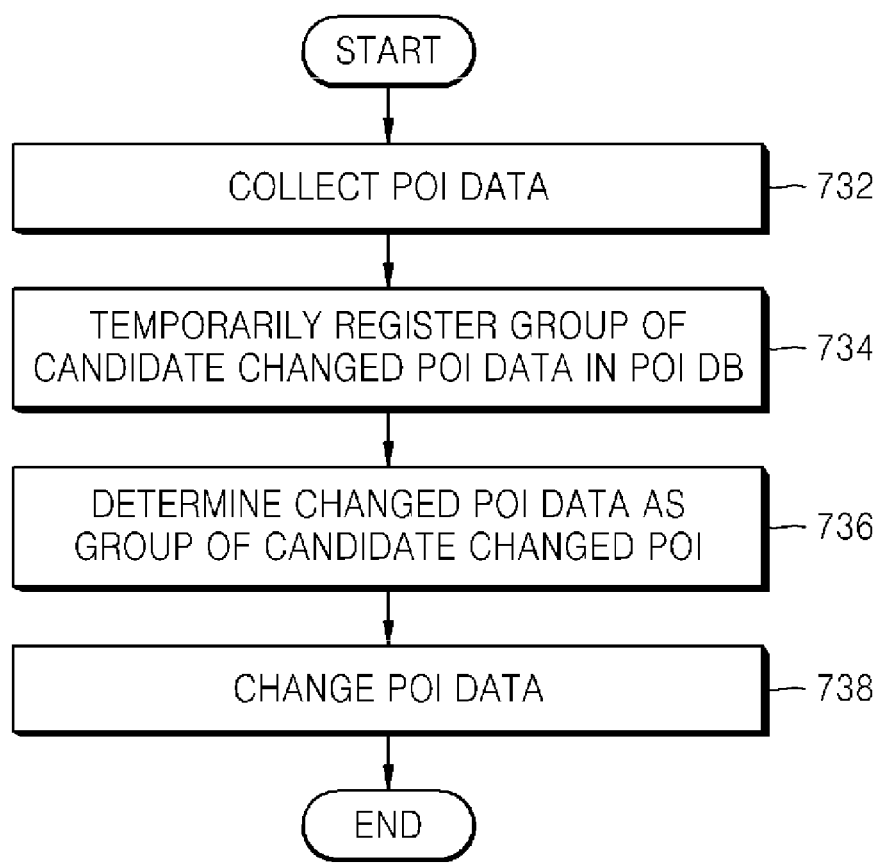

FIGS. 7A through 7C are flow charts of methods of map-updating a map server, according to embodiments of the present invention. Specifically, FIG. 7A is a flow chart of a method of map-updating, in which a POI alias is determined by the map server. Referring to FIG. 7A, various pieces of POI data corresponding to a group of candidate POI aliases are collected from at least one navigation terminal in a time sequence in operation 712. The group of candidate POI aliases collected from the navigation terminal is temporally registered in a POI database in operation 714.

By checking an integrity of the group of candidate POI aliases, the POI alias is determined in operation 716. The checking of integrity may be performed in a variety of ways. For example, a count value of each of the candidate POI aliases is compared with a critical value. If the count value of a candidate POI alias from among the candidate POI aliases is greater than the critical value, the candidate POI alias is determined to be reliable, and the candidate POI alias is determined as a formal POI alias. Alternatively, the formal POI alias may be determined from the candidate POI aliases by a filter-type method using a weighting according to a time order of inputting the candidate POI aliases or a person inputting the candidate POI aliases.

Then, the candidate POI alias is registered as the standard POI alias in the POI database in operation 718. The POI alias that has just been registered in the POI database is provided to the navigation terminal.

FIG. 7B is a flow chart of a method of map-updating, in which new POI data is determined by the map server. Referring to FIG. 7B, various pieces of POI data corresponding to a group of new candidate POI data are collected from at least one navigation terminal in a time sequence in operation 722. The group of new candidate POI data collected from the navigation terminal is registered (for example, sequentially) in a POI database in operation 724.

By checking an integrity of the group of new POI data, new POI data is determined in operation 726. The checking of integrity may be performed in a variety of ways, such as those described above with reference to FIG. 7A. Then, the new POI data is registered as standard POI data in the POI database in operation 728. The new POI data that has just been registered in the POI database is provided to the navigation terminal.

FIG. 7C is a flow chart of a method of map-updating, in which a POI alias and changed POI data of a predetermined POI data are determined in the map server. Referring to FIG. 7C, various pieces of POI data corresponding to a group of POI aliases and candidate changed POI data of the predetermined POI data are collected from at least one navigation terminal in a time sequence in operation 732.

The group of POI aliases and candidate changed POI data of the predetermined POI data collected from the navigation terminal is temporally registered in a POI database in operation 734.

By checking an integrity of the group of POI aliases and candidate changed POI data of the predetermined POI data, the POI alias and changed POI data of the predetermined POI data is determined in operation 736. The checking of integrity may be performed in a variety of ways, such as those described above with reference to FIG. 7A.

Then, the POI alias and changed POI data of the predetermined POI data are registered as formal POI alias and changed POI data of the predetermined POI data in the POI database in operation 738. The POI alias and changed POI data of the predetermined POI data that are registered in the POI database are provided to the navigation terminal.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

According to aspects of the present invention, a navigation terminal automatically generates many POI aliases. When the user does not know a standard name of a destination, the user inputs an alias that is usually known to the user and can easily find the destination. Moreover, the navigation terminal provides candidate POI data to a server, and thus a map server can change and update POI data without additional cost. In addition, the user can automatically provide data for map-updating to a POI server manager, and thus the POI server manager does not undertake many processes and incur high costs for map-updating. In addition, it is understood that aspects of the present invention can be applied to navigation terminals for vehicles, pedestrians, portable phones, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of map-updating of a navigation terminal, the method comprising:
    logging point of interest (POI) data if POI data for a destination is not found by the navigation terminal; and
    registering the logged POI data as a candidate POI alias of newly input POI data if a destination designated by the navigation terminal according to the newly input POI data is equal to an arrived destination.

2. The method as claimed in claim 1, further comprising:
    transmitting the candidate POI alias to a server; and
    receiving a POI alias determined according to a predetermined analysis from the server.

3. The method as claimed in claim 1, wherein the arrived destination is recognized at a point of time when a mobile vehicle is turned off or the navigation terminal is powered off.

4. The method as claimed in claim 1, wherein the arrived destination is recognized at a point of time when the navigation terminal is powered on after a mobile vehicle is turned on after being initially turned off.

5. The method as claimed in claim 1, wherein the candidate POI alias is registered as a group of new candidate POI data in a database.

6. The method as claimed in claim 2, wherein the POI alias is received via a wireless Internet.

7. The method as claimed in claim 2, wherein the POI alias is received via a peer-to-peer (P2P) network.

8. A computer readable recording medium encoded with the method of claim 1 and implemented by a computer.

9. A method of map-updating of a navigation terminal, the method comprising:
    logging point of interest (POI) data input in order to find a navigation destination when the POI data is not found in the navigation terminal; and
    registering the logged POI data as new candidate POI data of an arrived destination if a destination designated by the navigation terminal is not equal to the arrived destination and if predetermined POI data is not found for an area of predetermined range from the arrived destination.

10. The method as claimed in claim 9, further comprising:
    transmitting the candidate POI alias to a server; and
    receiving a new POI data determined according to a predetermined analysis from the server.

11. The method as claimed in claim 9, wherein the arrived destination is recognized at a point of time when a mobile vehicle is turned off or the navigation terminal is powered off.

12. The method as claimed in claim 9, wherein the arrived destination is recognized at a point of time when the navigation terminal is powered on after a mobile vehicle is turned on after being initially turned off.

13. The method as claimed in claim 9, wherein the new candidate POI data is registered as a group of new candidate POI data in a database.

14. The method as claimed in claim 10, wherein the new POI data is received via a wireless Internet.

15. The method as claimed in claim 10, wherein the new POI data is received via a peer-to-peer (P2P) network.

16. A computer readable recording medium encoded with the method of claim 9 and implemented by a computer.

17. A method of map-updating of a navigation terminal, the method comprising:
    logging point of interest (POI) data input in order to find a navigation destination when the POI data is not found in the navigation terminal; and
    registering the logged POI data as a candidate POI alias and/or candidate changed POI data of predetermined POI data if a destination designated by the navigation terminal is not equal to an arrived destination and if the predetermined POI data is found for an area of predetermined range from the arrived destination.

18. The method as claimed in claim 17, further comprising:
    transmitting the candidate POI alias and/or the candidate changed POI data to a server; and
    receiving a POI alias and/or changed POI data of the predetermined POI data determined according to a predetermined analysis from the server.

19. The method as claimed in claim 17, wherein the arrived destination is recognized at a point of time when a mobile vehicle is turned off or the navigation terminal is powered off.

20. The method as claimed in claim 17, wherein the arrived destination is recognized at a point of time when the navigation terminal is powered on after a mobile vehicle is turned on after being initially turned off.

21. The method as claimed in claim 17, wherein the candidate POI alias and/or the candidate changed POI data of the predetermined POI data is registered as a group of candidate POI aliases and/or a group of candidate changed POI data of the predetermined POI data, respectively, in a database.

22. The method as claimed in claim 18, wherein the POI alias and/or the changed POI data of the predetermined POI data are received via a wireless Internet.

23. The method as claimed in claim 18, wherein the POI alias and/or the changed POI data of the predetermined POI data are received via a peer-to-peer (P2P) network.

24. A computer readable recording medium encoded with the method of claim 17 and implemented by a computer.

25. A method of map-updating of a server, the method comprising:
    collecting a group of candidate point of interest (POI) aliases, a group of new POI data, and/or a group of candidate changed POI data of predetermined POI data in a time sequence;
    determining, according to a predetermined analysis, a POI alias, new POI data, and/or a changed alias of the predetermined POI data from among the group of candidate POI aliases, the group of new POI data, and/or the group of candidate changed POI data of the predetermined POI data; and
    transmitting the determined POI alias, the new POI data, and/or the changed POI alias of the predetermined POI data as updated POI data to a navigation terminal.

26. The method as claimed in claim 25, wherein the determining of the POI alias, the new POI data, and/or the changed alias of the predetermined POI data comprises comparing a critical value with a count value of each of the candidate POI aliases, the new candidate POI data, and/or the changed POI alias of the predetermined POI data.

27. The method as claimed in claim 25, wherein the determining of the POI alias, the new POI data, and/or the changed alias of the predetermined POI data comprises setting a weighting according to a user input and/or according to a time order of inputting the candidate POI aliases, the new candidate POI data, and/or the changed POI alias of the predetermined POI data.

28. A computer readable recording medium encoded with the method of claim 25 and implemented by a computer.

29. A navigation terminal to provide a travel route, the navigation terminal comprising:
 a point of interest (POI) database unit to store POI data;
 a display unit to display the travel route; and
 a control unit to log POI data corresponding to a destination when the POI data is not found in the POI database unit, and to register the logged POI data as a candidate POI alias or new candidate POI data of newly input POI data, or a candidate changed POI data of predetermined POI data according to a comparison between a destination designated by the navigation terminal according to the newly input POI data and an arrived destination in the POI database unit.

30. The navigation terminal as claimed in claim 29, wherein the control unit recognizes the arrived destination at a point of time when a mobile vehicle is turned off or the navigation terminal is powered off.

31. The navigation terminal as claimed in claim 29, wherein:
 the control unit registers the logged POI data as the candidate POI alias of the newly input POI data in a database when the destination designated by the navigation terminal according to the newly input POI data is equal to the arrived destination;
 the control unit registers the logged POI data as the new candidate POI data in the database when the destination designated by the navigation terminal according to the newly input POI data is not equal to the arrived destination and when the predetermined POI data is not found for an area of predetermined range from the arrived destination; and
 the control unit registers the logged POI data as the candidate POI alias or the candidate changed POI data of the predetermined POI data in the database when the destination designated by the navigation terminal according to the newly input POI data is not equal to the arrived destination and when the predetermined POI data is found for an area of predetermined range from the arrived destination.

32. A method of map-updating of a navigation terminal, the method comprising:
 logging point of interest (POI) data if POI data for a destination is not found by the navigation terminal; and
 registering, in the navigation terminal, the logged POI data as a candidate POI alias of existing POI data for the destination and/or as new candidate POI data.

33. The method as claimed in claim 32, further comprising:
 transmitting the candidate POI alias and/or the new candidate POI data to a server; and
 receiving a POI alias and/or new POI data determined according to a predetermined analysis from the server.

34. A method of map-updating of a navigation terminal, the method comprising:
 logging point of interest (POI) data input in order to find a navigation destination when the POI data is not found in the navigation terminal; and
 registering the logged POI data as new candidate POI data of an arrived destination if a destination designated by the navigation terminal is not equal to the arrived destination.

35. The method as claimed in claim 34, further comprising:
 transmitting the candidate POI alias to a server; and
 receiving a new POI data determined according to a predetermined analysis from the server.

36. A method of map-updating of a navigation terminal, the method comprising:
 logging point of interest (POI) data if POI data for a destination is not found by the navigation terminal;
 registering the logged POI data as a candidate POI alias of newly input POI data if a destination designated by the navigation terminal according to the newly input POI data is equal to an arrived destination;
 registering the logged POI data as new candidate POI data of an arrived destination if a destination designated by the navigation terminal is not equal to the arrived destination and if predetermined POI data is not found for an area of predetermined range from the arrived destination; and
 registering the logged POI data as the candidate POI alias and/or candidate changed POI data of predetermined POI data if the destination designated by the navigation terminal is not equal to the arrived destination and if the predetermined POI data is found for the area of predetermined range from the arrived destination.

37. A navigation system comprising:
 a navigation terminal to provide a travel route, the navigation terminal comprising:
  a point of interest (POI) database unit to store POI data,
  a display unit to display a travel route,
  a control unit to log POI data corresponding to a destination when the POI data is not found in the POI database unit, and to register the logged POI data as a candidate POI alias or new candidate POI data of newly input POI data, or a candidate changed POI data of predetermined POI data according to a comparison between a destination designated by the navigation terminal according to the newly input POI data and an arrived destination in the POI database unit, and
  a transmission unit to transmit the candidate POI alias, the new candidate POI data, or the candidate changed POI data; and
 a server comprising:
  a receiving unit to receive the candidate POI alias, the new candidate POI data, or the candidate changed POI data,
  a server control unit to determine a POI alias, new POI data, and/or a changed alias of the predetermined POI data from among the candidate POI aliases, the new candidate POI data, and/or the candidate changed POI data of the predetermined POI data according to a predetermined analysis, and
  transmitting the determined POI alias, the new POI data, and/or the changed alias of the predetermined POI data as updated POI data to the navigation terminal.

38. The navigation system as claimed in claim 37, wherein:
 the control unit registers the logged POI data as the candidate POI alias of the newly input POI data in a database when the destination designated by the navigation terminal according to the newly input POI data is equal to the arrived destination;

the control unit registers the logged POI data as the new candidate POI data in the database when the destination designated by the navigation terminal according to the newly input POI data is not equal to the arrived destination and when the predetermined POI data is not found for an area of predetermined range from the arrived destination; and the control unit registers the logged POI data as the candidate POI alias or the candidate changed POI data of the predetermined POI data in the database when the destination designated by the navigation terminal according to the newly input POI data is not equal to the arrived destination and when the predetermined POI data is found for an area of predetermined range from the arrived destination.

39. The navigation system as claimed in claim 38, wherein the server control unit determines the POI alias, the new POI data, and/or the changed alias of the predetermined POI data by comparing a critical value with a count value of each of the candidate POI aliases, the new candidate POI data, and/or the changed POI alias of the predetermined POI data.

40. The navigation system as claimed in claim 38, wherein the server control unit determines the POI alias, the new POI data, and/or the changed alias of the predetermined POI data by setting a weighting according to a user input and/or according to a time order of inputting the candidate POI aliases, the new candidate POI data, and/or the changed POI alias of the predetermined POI data.

* * * * *